Patented Apr. 12, 1927.

1,624,675

UNITED STATES PATENT OFFICE.

ERNST PREISWERK, OF BASEL, SWITZERLAND, ASSIGNOR TO THE HOFFMANN-LA ROCHE CHEMICAL WORKS, OF NEW YORK, N. Y., A CORPORATION OF NEW YORK.

O-O-DIACYL DERIVATIVES OF DIPHENOLISATINE AND PROCESS FOR THE MANUFACTURE OF SAME.

No Drawing. Application filed October 18, 1923, Serial No. 669,237, and in Switzerland November 27, 1922.

It has been found that the O-O-diacyl derivatives of diphenolisatine and its substitution products may be obtained by mildly acylating diphenolisatine and its substitution products, that is to say acylating with agents acting under conditions in which less chemical energy is developed than necessary to allow the entrance of a third acyl group into the molecule of diphenolisatine.

Acetyl compounds of diphenolisatine have already been prepared. Baeyer and Lazarus (Berichte der Deutschen Chemischen Gesellschaft, 18, 1885, page 2642) have for instance by several hours' boiling of diphenolisatine with acetic acid anhydride with a reflux condenser obtained a monoacetyl compound crystallizing in colourless needles and melting at 185° C. On following up the indications concerning the formation of monoacetyl-diphenolisatine Liebermann and Danaila (Berichte der Deutschen Chemischen Gesellschaft, 40, 1907, page 3592/93) however found that by proceeding according to the method of Baeyer and Lazarus tri-acetyl-diphenolisatine is always produced which, however, is more easily obtained by using acetic acid anhydride and sodium acetate. Tri-acetyl-diphenolisatin, melting at 201–202° C., is easily soluble in benzol and may with the addition of ligroin be crystallized from alcohol or chloroform. Finally the article (Berichte der Deutschen Chemischen Gesellschaft, 40, 1907, page 3594) mentions Di(?)acetyldiphenoldibromisatine, the doubtful formation of which is said to be due to the influence of the two bromine atoms which render the access of the third acetyl group difficult.

From the indications contained in literature, it was not possible to conclude that by mildly acylating the O-O-diacetyl and O-O-diacyl derivatives of diphenolisatine and its substitution products could easily be obtained and that the yield would be good. According to the acylating agent used the step of mildly acylating, as distinguished from the step of acylating in the prior art, may be performed, for instance, by diluting the acylating agent or using a smaller proportion thereof, by shortening the reaction period or by working at a lower temperature; or an agent may be used which, by its own nature, reacts more mildly than those heretofore employed. Thus if in the formula hereinafter given in Example 1, O-O-diacetyl diphenolisatine is obtained by heating a mixture of diphenolisatine and acetic acid anhydrid over a water bath. If the temperature were raised to the boiling point, or sodium acetate were added to the acetic acid anhydrid, the latter would not act as a mildly acylating agent and triacetyl diphenolisatine would be produced. In Example 4 acetyl chlorid is caused to acylate mildly by being diluted with pyridine. If the acetyl chlorid were used undiluted, too much chemical energy would be developed to permit diacetyl diphenolisatine to be produced. In Example 6 the benzoyl-chlorid is cooled and used in the presence of sodium hydroxid solution. Without the addition of such solution and without cooling the benzoyl-chlorid would not act as a mildly acylating agent.

The new compounds are almost entirely insoluble in water, likewise in cold dilute mineral acids and with few exceptions also in cold dilute alkalis, aqueous solution of sodium carbonate and ammonia. In organic solvents, such as alcohol, acetone, ethyl acetate, benzol or concentrated acetic acid, they are more or less soluble. O-O-diacetyl-diphenolisatine is the least soluble compound. By warming with aqueous or alcoholic alkalis the products are saponified and the alkali-soluble diphenolisatine and its substitution products respectively are formed, the alkaline solutions of which, by the addition of ferricyanide of potassium, turn intensely red to blue in colour.

The new compounds are to be used in therapy, as they possess laxative properties and are at the same time only very moderately toxic. In the animal test, doses of more than 1 g. per kilo bodyweight have no toxic effect.

*Example 1.*

235 gravimetrical parts of acetic acid anhydride (90 per cent) are poured over 106 gravimetrical parts of diphenolisatine (Berichte der Deutschen Chemischen Gesellschaft, 18, 1885, page 2641) and the mixture is heated on the water-bath while stirring. The solid starting material temporarily dissolves almost entirely and shortly afterwards the reaction product turns into a crystalline paste. In order to complete the reaction the heating on the water-bath is continued for a short time and then the whole is left to get cold. The reaction product may for instance be separated in the following manner: To the cold reaction mixture is gradually added about the same volumetrical quantity of alcohol; in this manner the excess of acetic acid anhydride is destroyed and the paste becomes thinner. Then the fluid is drawn off and the product washed with alcohol. For complete cleansing another extraction is made with warm alcohol and the product crystallized for instance from 10 parts of acetic acid. The product represents a light, fine crystalline powder, which is difficultly soluble or even insoluble in the usual organic solvents. Its melting point lies at 242° C. In water it is absolutely insoluble, likewise in cold dilute sodium hydroxide solution. After prolonged stirring with warm sodium hydroxide solution the product is dissolved and from the solution diphenolisatine is separated by acidifying. The analysis of O-O-di-acetyl-diphenolisatine showed the following figures:

Calculated for $C_{24}H_{19}O_5N$—
$C=71.80\%$ $H=4.77\%$
found I $C=71.92\%$ $H=4.85\%$
II $C=71.70\%$ $H=4.95\%$

Example 2.

480 gravimetrical parts of acetic acid anhydride (93 per cent) and 160 parts of benzol are poured over 160 parts of diphenolisatine and the mixture is slowly heated to 40° C. on the water-bath while stirring. Then is added 1 gravimetrical part of concentrated sulphuric acid, after which the temperature quickly rises. Diphenolisatine temporarily dissolves almost entirely, then the di-acetyl derivative crystallizes quickly from the mixture. To complete the reaction heating is continued for 3 hours to 90° C., then are added 160 parts of benzol. The mixture is then left to get cold while stirring, the fluid drawn off and the product washed with benzol. The filter residue is stirred with 320 gravimetrical parts of alcohol at 60° C., drawn off after cooling and washed with cold alcohol. O-O-di-acetyl-diphenolisatine thus obtained is almost pure as to melting point and may be crystallized as described in Example 1. The yield is about 180 to 185 gravimetrical parts.

Example 3.

1 part of diphenolisatine is stirred with 5 parts of benzol, 1 part of concentrated acetic acid and 0.5 parts of phosphorous oxychloride are added and then heated during 5 hours on the water-bath with a reflux condenser. The benzol is driven off with steam, there remains an oil-like fluid which, when cold, solidifies. The paste thus separated from the water, is cut into small pieces and boiled with 10 parts of alcohol. The product is filtered while hot, the residue washed with cold alcohol and crystallized for instance from concentrated acetic acid. The product is identical with that described in Example 1.

Example 4.

255 gravimetrical parts of diphenolisatine are dissolved in 2000 gravimetrical parts of pyridine. The solution is cooled while stirring, then are added in portions and slowly 650 gravimetrical parts of acetyl chloride in such a manner as to prevent the temperature from rising above 0° C. When everything has been added, the mixture is stirred during a night (about 12 hours), the temperature being allowed to rise slowly. The pyridine is then driven off with steam. When cold the solid parts of the residue are separated from the water and cleansed by treating with alcohol etc., as described in Example 3. In this manner also pure O-O-di-acetyl-diphenolisatine is obtained.

Example 5.

A mixture of 2 parts of di-guaiacol-isatine (melting point 250–251° C.)—obtained from guaiacol and isatine as described for diphenolisatine in the Berichte der Deutschen Chemischen Gesellschaft, 18, 1885, page 2637.—2 parts of phenyl acetic acid and 1 part of phosphorous oxychloride is heated with 10 parts of benzol during 8 hours on a boiling water-bath with a reflux condenser. In order to remove the excess of phenyl acetic acid the water-insoluble part of the residue is mixed with dilute sodium hydroxide solution, filtered, washed with water and dried; then the product is boiled down with ether and the ether-insoluble part taken up with warm benzol. When cooling di-phenyl-acetyl-di-guaiacol-isatine crystallizes from the mixture. By crystallizing once more from alcohol the product is obtained in shining white crystals melting at 169–170° C. The product is insoluble in water, rather soluble in hot alcohol and concentrated acetic acid. By warm alcoholic solution the compound is saponified and di-guaiacol-isatine reproduced, which latter gives in alkaline solution with ferricyanide of potassium an indigo-blue colouring.

Example 6.

127 gravimetrical parts of diphenolisatine are stirred together with 2000 gravimetrical parts of water and dissolved by the addition of 300 volumetrical parts of sodium hydroxide solution (10 per cent). The solution is cooled to 0° C. and then at once 113 gravimetrical parts of benzoyl-chloride are added. A white residue is produced gradually. After sixteen hours' stirring the residue is filtered, washed with water and dried. In order to cleanse the raw material it can for instance be boiled down with 8 parts of alcohol. When cool the fluid is drawn off and the residue crystallized first from concentrated acetic acid and then from alcohol. The O-O-di-benzoyl-diphenolisatine thus obtained forms coarse prisms melting at 221–222° C. It is rather difficultly soluble in alcohol, much easier soluble in concentrated acetic acid, easily soluble in pyridine, insoluble in water and cold dilute sodium hydroxide solution. By boiling with alcoholic alkali lye saponification sets in.

*Example 7.*

Diphenolisatine is dissolved with 2 molecules of sodium hydroxide solution (about 1 per cent), warmed on the water-bath and at 70–80° C. the theoretic quantity of toluol-sulphochloride is added while stirring thoroughly. After half an hour's stirring the alkaline reaction has disappeared and a thick oil-like fluid is obtained which after stopping the stirring apparatus settles in the bottom of the vessel. When cold, it solidifies into a paste. This paste is well mixed with dilute sodium hydroxide solution, filtered, washed with water and dried. In order to cleanse it, the product is crystallized first from benzol and then, if necessary, repeatedly from alcohol (about 60 per cent). In the end O-O-di-toluolsulphonyl-diphenolisatine is obtained in white crystals melting at 219–220°. The product is easily soluble in alcohol and concentrated acetic acid, difficultly soluble in benzol, insoluble in water and cold dilute sodium hydroxide solution.

*Example 8.*

16 gravimetrical parts of diphenolisatine are with the addition of 40 gravimetrical parts of sodium hydroxide solution (11.45 per cent) dissolved in 220 parts of water. The solution is well cooled while stirring and at 0° C. gradually 11 parts of chloro-formic acid ester are added. After three hours' stirring the residue is filtered, washed and dried. By crystallizing from alcohol (about 45 per cent) the product is obtained in white needles melting at 156–157° C. The di-carbethoxy-diphenolisatine is easily soluble in benzol, alcohol and concentrated acetic acid, insoluble in water. With cold sodium or potassium hydroxide solution saponification slowly sets in, but it occurs more quickly however with the warm solution.

*Example 9.*

19 gravimetrical parts of di-guaiacol-isatine are suspended in 200 volumetrical parts of acetone (95 per cent) and dissolved with the addition of 31.5 parts of sodium hydroxide solution (12.7 per cent). The solution is well cooled, at 0° C. are added 17 parts of cinnamic acid chloride and the whole is stirred for another hour. The mixture is then diluted with the same volumetrical quantity of water and the acetone driven off with steam. The residue is filtered hot and the filter-residue washed with water, stirred with cold dilute sodium hydroxide solution, filtered, washed and dried. By crystallizing from concentrated acetic acid the product is obtained in fine white crystals melting at 230–231° C. Di-cinnamoyl-di-guaiacol-isatine is soluble in alcohol and concentrated acetic acid, insoluble in water and cold dilute sodium hydroxide solution.

*Example 10.*

19 gravimetrical parts of di-guaiacol-isatine are dissolved in the calculated quantity of sodium hydroxide solution (1 per cent) and the solution cooled to 0° C. Then 11 parts of chloro-formic acid ester are slowly added while stirring well; care must be taken that the temperature does not rise much above 0° C. Stirring is continued for 4 hours, the residue drawn off, well mixed with 300 parts of sodium hydroxide solution (1 per cent), filtered and washed with water. The insoluble part having repeatedly been crystallized from alcohol (about 60 per cent), di-carbethoxy-di-guaiacol-isatine is obtained in fine needles melting at 119–120° C. The product is easily soluble in alcohol, benzol and concentrated acetic acid, insoluble in water; cold dilute sodium hydroxide solution hardly saponifies, with warm aqueous hydroxide solution saponification sets in and the product is dissolved.

*Example 11.*

152 gravimetrical parts of di-ortho-cresol-chlorisatine—obtained by condensation of 4-chlorisatine with ortho-cresol—are stirred with 1520 gravimetrical parts of water and dissolved by the addition of 315 gravimetrical parts of sodium hydroxide solution (12.7 per cent). To the well cooled solution are added while stirring 115 gravimetrical parts of benzoyl-chloride gradually. After 16 hours the product separated from the mixture is filtered and washed with water. By crystallization from alcohol and concentrated actic acid di-benzoyl-di-ortho-cresol-isatine is obtained in white, fine crystals melting at 210–211° C. The product is easily soluble in alcohol, more difficultly soluble in concentrated acetic acid, insoluble in water and sodium or potassium hydroxide solution. By warming with alcoholic alkali saponification sets in.

*Example 12.*

300 gravimetrical parts of di-ortho-cresol-isatine, melting at 246–247° C., obtained by condensation of ortho-cresol with isatine in the presence of mineral acids, as described in the Berichte der Deutschen Chemischen Gesellschaft, 18, 1885, page 2637, for diphenolisatine, are dissolved in 1500 gravimetrical parts of acetic acid anhydride; to the solution is added 1 gravimetrical part of concentrated sulphuric acid. The temperature of the reaction product rises, owing to this addition, immediately for instance from 65 to 90° C. By the application of warmth the reaction is completed at 90° C., whereupon the clear solution is poured into about 10.000 parts of alcohol (about 15 per cent), whereby the acetyl derivative is separated in form of an oil-like fluid substance. By stirring the product gradually becomes solid and may be filtered in about an hour's time. The raw product, which is now of a powdery consistence, is mixed with water, filtered, the filter-residue washed with water and dried.

By crystallization from alcohol (about 45 per cent) O-O-di-acetyl-di-ortho-cresol-isatine is obtained in coarse white crystals melting at 180-181° C. It is easily soluble in alcohol and concentrated acetic acid, insoluble in water. On being warmed with sodium or potassium hydroxide solution it dissolves at the same time producing di-ortho-cresolisatine which in alkaline solution with ferricyanide of potassium gives a violet-red colouring.

The reactions which take place in these various examples are believed to be the following:

*Examples 1 and 2.*

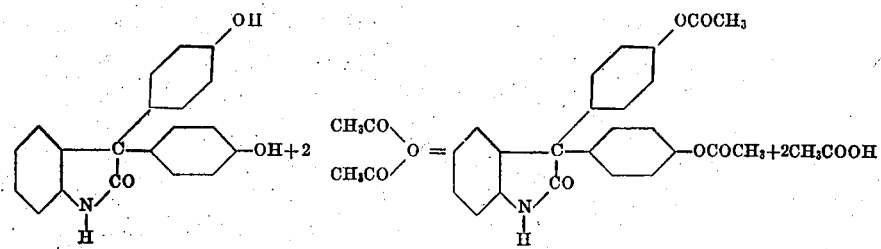

*Example 3.*

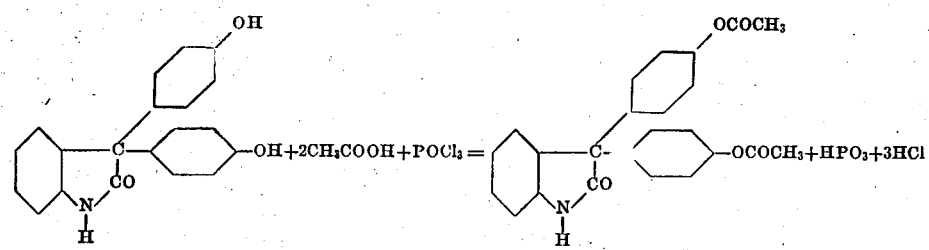

*Example 4.*

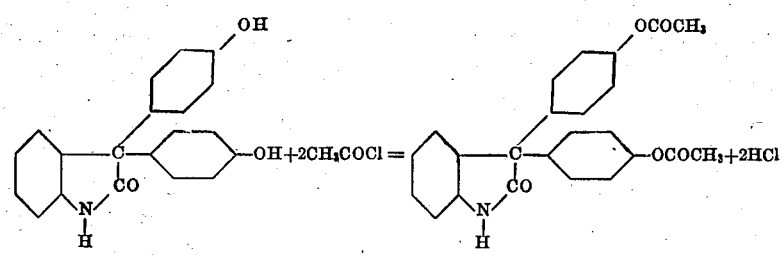

*Example 5.*

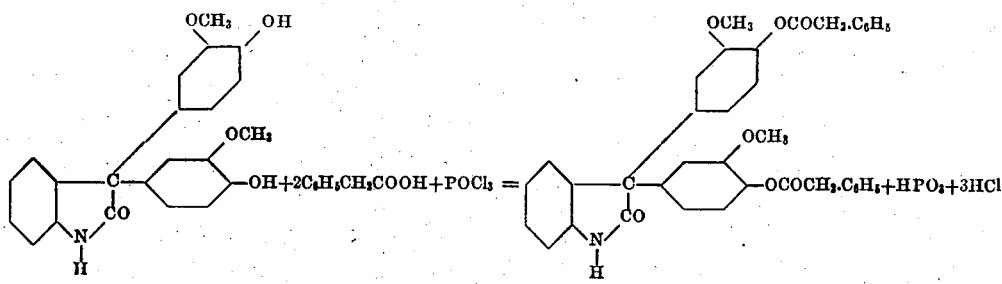

Example 6.
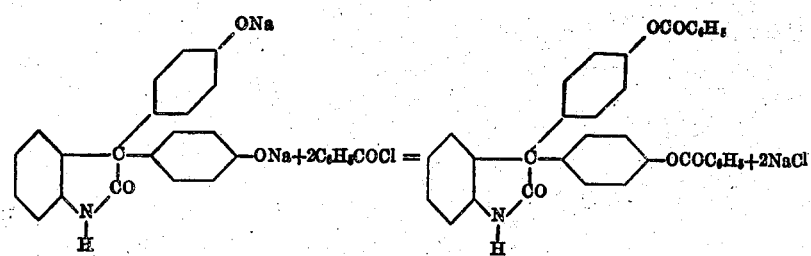
Example 7.
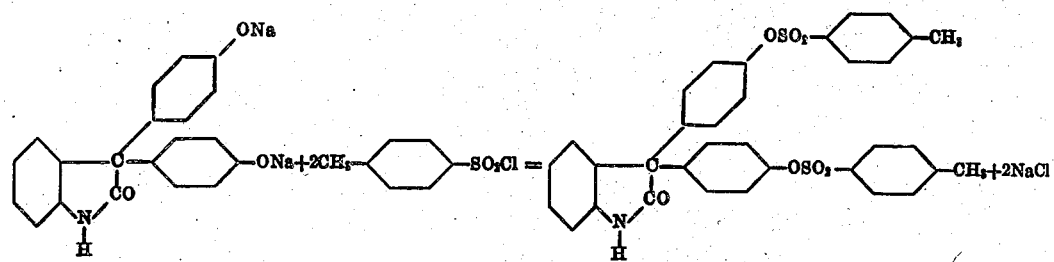
Example 8.
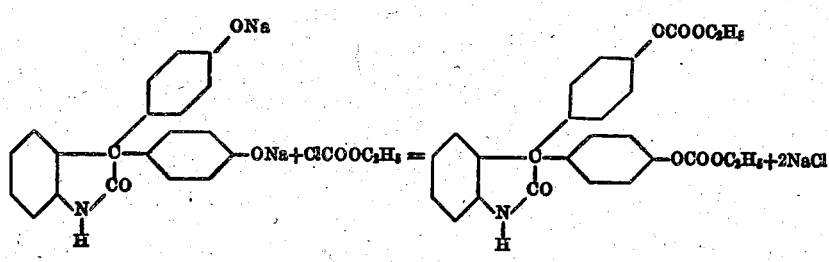
Example 9.
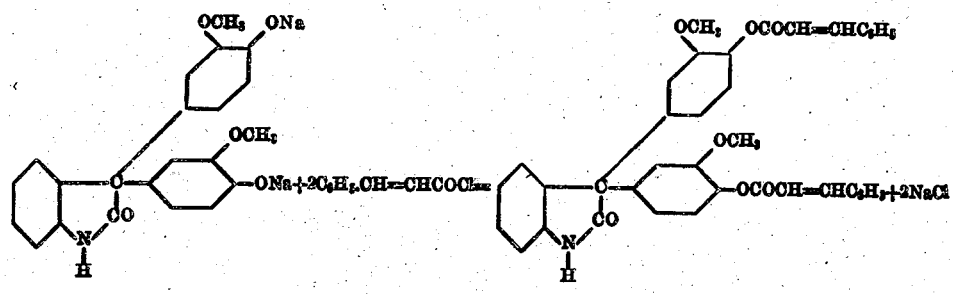
Example 10.
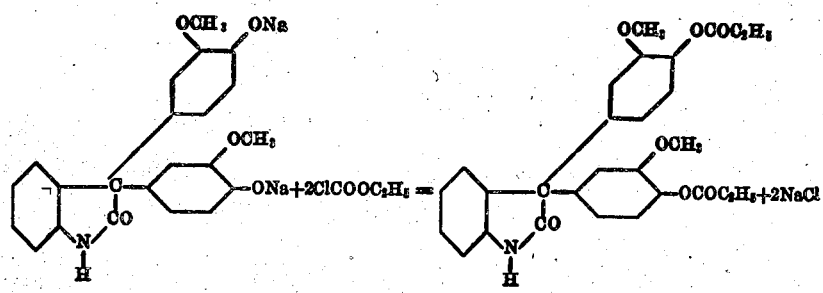

Example 11.

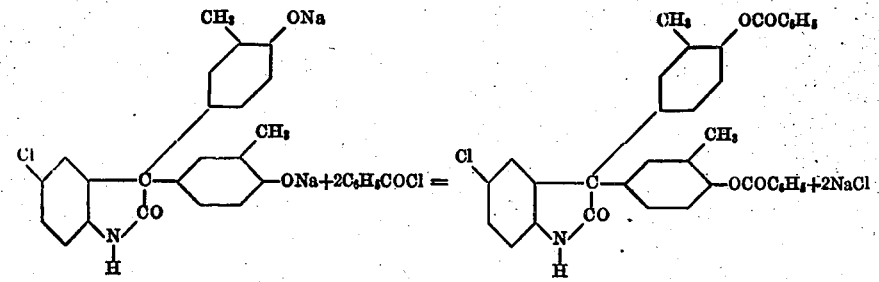

Example 12.

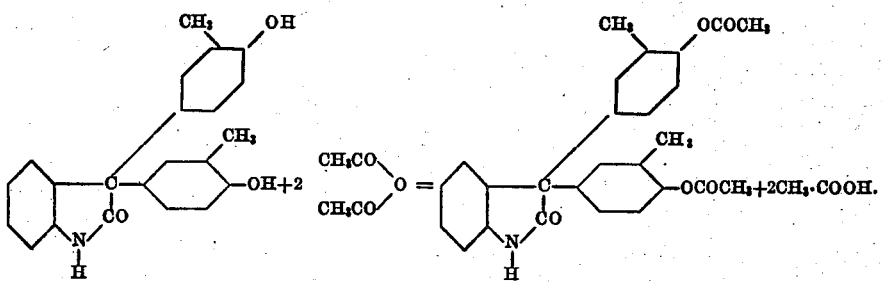

As hereinabove stated my process may be employed for treating not only diphenolisatine, but also its substitution products and, when I refer in my claims to a diphenolisatine, I intend to include in such designation both diphenolisatine and its substitution products.

I claim:

1. As new products the O-O-diacyl derivatives of a diphenolisatine which may be produced by treating a diphenolisatine with an acylating agent acting under conditions in which less chemical energy is developed than necessary to allow the entrance of a third acyl group into the molecule of diphenolisatine, the new compounds being almost entirely insoluble in water, likewise in cold dilute mineral acids and with few exceptions also in cold dilute alkalis, aqueous solution of sodium carbonate and ammonia, more or less soluble in organic solvents, such as alcohol, acetone, acetic acid ether, benzol or concentrated acetic acid, O-O-diacetyl-diphenolisatine being the least soluble compound, the products being saponified by warming with aqueous or alcoholic alkalis and an alkali-soluble diphenolisatine being thus formed, the alkaline solutions of which, by the addition of ferricyanide of potassium, turn intensely red to blue in color, the new compounds being destined for use in therapy, as they possess laxative properties and are at the same time only very moderately toxic, in the animal test doses of more than 1 g. per kilo bodyweight having no toxic effect.

2. As new products the O-O-diacyl derivatives of diphenolisatine substitution products in the phenol group which may be produced by treating diphenolisatine substitution products in the phenol group with an acylating agent acting under conditions in which less chemical energy is developed than necessary to allow the entrance of a third acyl group into the molecule of diphenolisatine, the new compounds being almost entirely insoluble in water, likewise in cold dilute mineral acids and with few exceptions also in cold dilute alkalis, aqueous solution of sodium carbonate and ammonia, more or less soluble in organic solvents, such as alcohol, acetone, acetic acid ether, benzol or concentrated acetic acid, O-O-diacetyl-diphenolisatine being the least soluble compound, the products being saponified by warming with aqueous or alcoholic alkalis, alkali-soluble diphenolisatine substitution products being thus formed, the alkaline solutions of which, by the addition of ferricyanide of potassium, turn intensely red to blue in color, the new compounds being destined to be used in therapy, as they possess laxative properties and are at the same time only very moderately toxic, in the animal test doses of more than 1 g. per kilo bodyweight having no toxic effect.

3. As new products the O-O-diacyl derivatives of diphenolisatine substituted in the isatine group which may be produced by treating diphenolisatine substituted in the isatine group with an acylating agent acting under conditions in which less chemical energy is developed than necessary to allow the entrance of a third acyl group into the molecule of diphenolisatine, the new compounds being almost entirely insoluble in water, likewise in cold dilute mineral acids and with few exceptions also in cold dilute alkalis, aqueous solution of sodium carbonate and ammonia, more or less soluble in organic solvents, such as alcohol, acetone, acetic acid ether, benzol or concentrated acetic acid, O-O-diacetyl-diphenolisatine being the least soluble compound, the products being saponified by warming with aqueous or alcoholic alkalis and the alkali-soluble diphenolisatine substitution products being thus formed, the alkaline solutions of which, by the addition of ferricyanide of potassium, turn intensely red to blue in color, the new compounds being destined for use in therapy, as they possess laxative properties and are at the same time only very moderately toxic, in the animal test doses of more than 1 g. per kilo bodyweight having no toxic effect.

4. As a new product of O-O-diacetyl-diphenolisatine which may be produced by treating diphenolisatine with an acylating agent under conditions in which less chemical energy is developed than necessary to form triacetyl diphenolisatine, the new compound being a light, fine crystalline powder, which is difficultly soluble or even insoluble in the usual organic solvents, absolutely insoluble in water, likewise in cold dilute sodium hydroxide solution, its melting point being 242° C., the product being dissolved after prolonged stirring with warm sodium hydroxide solution and diphenolisatine being separated from the solution by acidifying, the new compound being destined for use in therapy, as it possesses laxative properties and is at the same time only very moderately toxic, in the animal test doses of more than 1 g. per kilo bodyweight having no toxic effect.

5. The process for the manufacture of O-O-diacyl derivatives of a diphenolisatine which consists in treating a diphenolisatine with an acylating agent acting under conditions in which less chemical energy is developed than is necessary to allow the entrance of a third acyl group into the molecule of diphenalisatine.

6. The process for the manufacture of O-O-diacyl derivatives of diphenolisatine substitution products in the phenol group which consists in treating diphenolisatine substitution products in the phenol group with an acylating agent acting under conditions in which less chemical energy is developed than is necessary to allow the entrance of a third acyl group into the molecule of diphenolisatine.

7. The process for the manufacture of O-O-diacetyl-diphenolisatine which consists in treating diphenolisatine with an acetylating agent under conditions in which less chemical energy is developed than necessary to form triacetyl diphenolisatine.

8. The process for the manufacture of O-O-diacetyl-diphenolisatine which consists in treating diphenolisatine with acetic acid anhydride and heating the mixture on the water-bath.

9. The process for the manufacture of O-O-diacetyl-diphenolisatine which consists in treating diphenolisatine with acetic acid anhydride and adding concentrated sulphuric acid at a temperature below 100° C.

In witness whereof I have hereunto set my hand.

ERNST PREISWERK.